United States Patent [19]

Gstrein

[11] Patent Number: 5,549,967
[45] Date of Patent: Aug. 27, 1996

[54] PAPERMAKERS' PRESS FABRIC WITH INCREASED CONTACT AREA

[75] Inventor: Hippolit Gstrein, Gloggnitz, Austria

[73] Assignee: Huyck Licensco, Inc., Wilmington, Del.

[21] Appl. No.: 433,676

[22] Filed: May 4, 1995

[51] Int. Cl.$^6$ .............. D03D 15/00; B32B 5/26; B32B 31/00
[52] U.S. Cl. .............. 428/229; 28/109; 28/110; 156/148; 156/155; 428/234; 428/252; 428/257; 428/258; 428/259; 428/909
[58] Field of Search .............. 428/229, 234, 428/252, 257, 258, 259, 909; 156/148, 155; 28/109, 110

[56] References Cited

U.S. PATENT DOCUMENTS

| | | | |
|---|---|---|---|
| 4,259,394 | 3/1981 | Khan | 428/229 |
| 4,261,392 | 4/1981 | Westhead | 139/383 A |
| 4,274,448 | 6/1981 | Westhead | 139/383 A |
| 4,533,594 | 9/1985 | Buchanan | 428/236 |
| 5,077,116 | 12/1991 | Lefkowitz | 428/141 |
| 5,204,150 | 4/1993 | Davenport | 428/58 |
| 5,391,419 | 2/1995 | Davenport | 428/193 |

*Primary Examiner*—James Withers
*Attorney, Agent, or Firm*—Lorusso & Loud

[57] ABSTRACT

A press fabric incorporating bicomponent material in fiber form or yarn form, the bicomponent material having a core material with a higher melting point surrounded by a covering material with a lower melting point. The bicomponent material will be present in the base fabric in yarn form and/or in the batt material in fiber form in amount ranging from 10–100%. Upon heatsetting the assembled press fabric structure, the lower melting point material of the bicomponent material becomes soft, flowing into the crossing of the batt fibers, if present in the batt material, or into the crossings of the weave pattern, if present in a base fabric, to form a matrix.

17 Claims, 1 Drawing Sheet

PAPERMAKERS' PRESS FABRIC WITH INCREASED CONTACT AREA

BACKGROUND OF THE INVENTION

This invention relates to papermakers' fabrics and especially to papermaking fabrics for the press section of a papermaking machine.

In the conventional fourdrinier papermaking process, a water slurry or suspension of cellulose fibers, known as the paper "stock", is fed onto the top of the upper run of a travelling endless forming belt. The forming belt provides a papermaking surface and operates as a filter to separate the cellulosic fibers from the aqueous medium by providing for the drainage of the aqueous medium through its mesh openings, also known as drainage holes, by vacuum means or the like located on the drainage side of the fabric.

After leaving the forming medium the somewhat self-supporting paper web is transferred to the press section of the machine and onto a press fabric, where still more of its water content is removed by passing it through a series of pressure nips formed by cooperating press rolls, these press rolls serving to compact the web as well.

Subsequently, the paper web is transferred to a dryer section where it is passed about and held in heat transfer relation with a series of heated, generally cylindrical rolls to remove still further amounts of water therefrom.

In general, the press fabrics in the press section are used in papermaking machinery to support the moist, freshly formed paper web as it encounters a variety of rolls to extract water from the moist paper web. In addition to serving as a support for the moist paper web, the press fabric serves as a receptacle for the water removed from the paper sheet. Preferably, the press fabric incorporates at least one base fabric woven so as to have relatively large open areas or voids which will enhance its water-conveying capabilities. To the base fabric is added one or more layers of batt material. The press fabric normally has a conveyer belt-like shape and during the various operations previously mentioned, a large amount of water built up in the press fabric, generally in the base fabric, is subsequently removed by suction or various other drainage devices, usually after the paper web and press fabric are no longer in direct contact.

In the press section of the machine, it is advantageous to remove as much water as possible from the paper web without causing any damage thereto, such as by crushing. Crushing occurs when an excessive amount of water is removed from the paper web, the excessive water then accumulating at the ingoing side of the nip, not carrying through the nip, and moving in a direction counter to that of the moving paper web. Accordingly, care should be taken to ensure that there is sufficient void volume present in the area of the press nip (either in the papermaking fabric or in the press rolls) such that as the paper web undergoes compaction and compression, all of the water expressed therefrom will be carried through the nip.

The resilience of a press fabric is calculated by the change in permeability and caliper of the press fabric from when it enters the press nip to when it leaves the press nip. The decrease in permeability and/or caliper in the press fabric after going through the press nip is used as a parameter for compaction resistance.

Moreover, characteristics such as paper sheet dewatering, sheet surface smoothness, sheet pick-up and sheet carrying, among others, are sensitive to press fabric design. An ideal press fabric will promote an increased area of interface, or contact area, between the fabric and paper, leading to greater adhesion between the fabric and the sheet, and therefore to improved sheet pick up and sheet carrying performance. In addition, the increased sheet/fabric interface area provides a more effective sheet support in the press, leading to more efficient sheet dewatering.

The surface of the press fabric is determinative of the marking characteristics found on the paper. The surface of the base fabric is usually determinative of the amount of shadow marking. If the surfaces of both the base fabric and the press fabric are more uniform, drainage of the press fabric will be better and the sheet surface quality will be higher. The quality of sheet surface uniformity is determined by the combination of contact points and contact area of the press felt, and in press fabrics having good uniformity, the contact area is increased.

Therefore, one object of the present invention is to provide an improved papermakers' fabric for use in the press section of the papermaking machine.

Another object of this invention is to provide a papermakers' fabric having means for increasing the amount of water removed from a paper web in the press section of a papermaking machine.

A further object of the present invention is to provide an improved papermakers' press fabric having increased compaction resistance and better resilience.

Still another object of the present invention is to provide an improved papermakers' press fabric providing superior wear resistance.

A further object of the present invention is to provide a press fabric having an improved surface, giving uniform drainage and better sheet quality.

Another object of the present invention is to provide a papermakers' press fabric with a stabilized batt layer, providing constant runnability.

SUMMARY OF THE INVENTION

The present invention is a press fabric that incorporates a bicomponent material.

According to the present invention, a bicomponent material is a material in fiber or yarn form having a core material with a higher melting point surrounded by a covering material with a lower melting point. In a preferred embodiment, the bicomponent material, in fiber or yarn form, will constitute 20–60% core material and 80–40% covering material. The bicomponent material may be formed into yarns that can be woven into a woven fabric. Alternatively, the bicomponent material can be made into non-woven fibers. A press fabric according to the present invention will be finished according to conventional methods, whereby the lower melting point covering material of the bicomponent material becomes soft, flowing into the crossing of the batt fibers and/or of the weave pattern and forms a matrix, a fabric similar to a sieve without knuckles.

The press fabric of the present invention will be apparent from the following detailed description of the invention, along with the drawings, in which like reference numbers refer to like members throughout the various views.

DETAILED DESCRIPTION OF THE INVENTION

Figure 1:
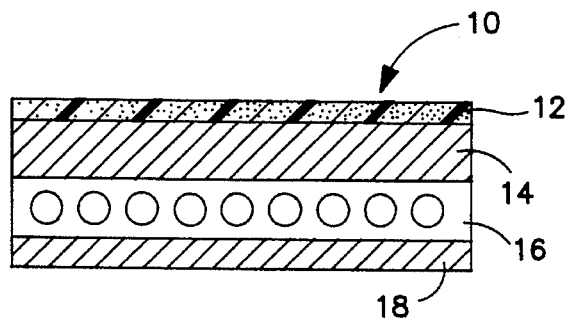
FIG. 1 illustrates in diagrammatic form one embodiment of the press fabric of the present invention.

The present invention will be described broadly, with a more detailed description following. Described herein is a papermakers' fabric for use in the press section of the papermaking machine. The press fabric of the present invention incorporates a bicomponent material, and exhibits increased contact area, better surface uniformity and compaction resistance than known press fabrics.

As in most press fabrics, the papermakers' fabric of the present invention incorporates one or more layers of a base fabric. Each base fabric of the one or more layers of base fabric may be a single layer or a multilayer fabric. If there is one base fabric, the weave for the base fabric will be selected according to the type of paper to be produced with the press fabric. If there is more than one base fabric incorporated into the press fabric of the present invention, the weave design of the individual fabric layers may be identical or they may be different. Generally, in the case of more than one base fabric being present, the base fabric on the side of the press fabric that will contact the paper web will have a favorable papermaking surface. In addition, the base fabric on the side of the press fabric that will contact the papermaking machine will have superior wear and abrasion resistant characteristics. It is within the skill of those knowledgeable in the field to select weaves for the one or more base fabrics to meet the needs of the press fabric as required for its anticipated use.

The conventional yarns utilized in the one or more base fabrics of the press fabric of the present invention will vary, depending upon the desired properties of the final composite press fabric. For example, the yarns may be multifilament yarns, monofilament yarns, twisted multifilament and/or monofilament yarns, spun yarns or any combination of the above. It is within the skill of those practicing in the relevant art to select a yarn type, depending on the purpose of the desired press fabric, to utilize with the concepts of the present invention.

Yarns selected for use in each of the fabric layers of the base fabric of the press fabric of the present invention may be those commonly used in press fabric base fabric layers. For example, the yarns could be cotton, wool, polypropylenes, polyesters, aramids or polyamides. Again, one skilled in the relevant art will select a yarn material according to the particular application of the final composite press fabric.

The press fabric of the present invention may also incorporate one or more layers of batt material. The batt material fibers making up the one or more layers of batt material may be of the same general thickness throughout the press fabric or they may be stratified. A layer of fine batt material fibers on the papermaking surface will often be called a cap layer whereas a layer of coarse batt material fibers is generally called the substrate. These terms are known in the industry. The conventional batt material is generally fibers formed from any of the well known natural or synthetic fibers which are commonly used for this purpose, including such animal fibers as wool and such synthetic fibers as polyacrylics, such as Orlon, polyesters such as Dacron, and polyamide such as Nylon.

The bicomponent material is an essential part of the press fabric of the present invention and may be present in one or more of the base fabrics, and/or in one or more batt layers. The bicomponent material is produced in fiber or yarn form having a core material with a higher melting point, surrounded by a covering material with a lower melting point. In any press fabric according to the present invention, the ratio of the bicomponent material to standard materials within a layer may vary between 10–100%. Useful in the present invention for the higher melting point core material is Polyamide 6.6, polyamide 6, polyamide 6.10, copolyester and polyester, with melting points above 180° C. Suitable for the lower melting point cover material are polyamides, copolyamides, polypropylene and polyethylene, having an approximate melting point below 180° C. Suitable covering materials are sold under the designations polyamide 6.12, polyamide 6, polyamide 12, polyamide 11. These bicomponent fiber and monofilament materials are available from a number of suppliers, such as ICI United States, Inc., Wilmington Del. 19897.

In a preferred embodiment, the bicomponent material fiber or yarn will constitute 20–60% core material and 80–40% covering material.

In fiber form, bicomponent material may be present in one, more than one or all layers of batt material. When the bicomponent material is used in the batt material, it may be used in a cap layer, on the side of the press fabric that contacts the paper to be formed. Alternatively, it can be used in substrate layers on both sides of the base fabric, and/or in a layer of batt material on the side of the press fabric that contacts the machine. Additionally, the batt layer containing bicomponent material can be added all throughout the press fabric, on each surface and even between two or more layers of base fabric. With these usages, the bicomponent material is produced in fiber form and distributed in random orientation with other conventional batt material (if any) as a layer on and/or between the assembled layers of a press fabric. The bicomponent material fibers can vary in amounts within the batt material layer from 10–100%, with any remaining batt material fibers consisting of conventional batt material.

As an additional embodiment of the present invention, one, more than one or all of the base fabrics can be produced with yarns of bicomponent material. In yarn form, the bicomponent material will be made into monofilaments preferably. The monofilaments may be single monofilaments or they may be twisted monofilaments. In this embodiment, the bicomponent material preferably will be produced into twisted or single monofilaments, present in the base fabric in amounts varying from 10–100%, and the remaining yarns, if any, will be of conventional material. The yarns of bicomponent material may run in the machine direction and/or in the cross machine direction, as will the conventional yarns, if any. Yarns of bicomponent material used in any one direction in the fabric will preferably constitute 100% of the yarns running in that direction of the fabric, although blending with conventional yarns in that direction is possible. To the one or more layers of base fabric, layers of batt material, and/or layers of batt material including bicomponent material can be added to produce a press fabric.

Once the layers as described above are assembled, they are preferably needled together, as is known in the art, in one or more needling operations. In the needling process, all the layers are joined together. Alternatively, the layers will be bonded, as is known in the art.

After needling, the assembled structure is subjected to one or more heat setting operations. Heat setting has the effect of stabilizing felt dimensions, and with the bicomponent material present according to this invention, softening the lower melting point cover material. If the bicomponent material is used in a batt layer, the bicomponent material flows into the crossings of the batt, forming a kind of matrix within the batt layer. When bicomponent material is used in a base fabric, heat setting has two effects. Initially, the softened surface of the base fabric provides for better bonding of the fibrous batt material to the base fabric. Additionally, the base fabric structure is smoothened by flattening the base fabric knuckles and round shaped monofilaments. The one or more heat setting operations are performed at approximately 150° C. to 180° C., according to the bicomponent material fibers used. The temperature at which heat setting is performed should be high enough to soften or melt the lower melting point material but not high enough to affect the higher melting point core material. It is within the skill of those knowledgeable in the art to select the desirable temperature for heat setting according to the concept of the present invention.

It has been shown that a press fabric incorporating the concepts of the present invention has greater wear resistance and compaction resistance, in some instances up to 50% more than conventional press fabrics. In traditional press fabrics, most compaction occurs in the batt material. It has been found that with the present invention, the batt material is stabilized by creation of the matrix and consequently, the papermakers' fabric's drainage over its life is improved.

Additionally, the melting process increases contact area on the press fabric surface and gives more uniform pressure transfer and consequently, better sheet quality. Finally, the knuckles in a base fabric incorporating bicomponent material yarns are smoothened by the finishing process. With such a surface, the press fabric will have more uniform pressure transfer, be less prone to mark the paper and provides a more uniform paper surface.

The principles of the present invention will be further described with reference to the embodiments shown in the figures. Such embodiments are to be considered as illustrative, but not limiting.

FIG. 1 shows, in cross section, one embodiment of a press fabric 10 according to the present invention, including stratified batt layers. The top surface fine batt material layer or cap layer 12 incorporates bicomponent material fibers. Immediately below the cap layer is a substrate batt layer 14 of conventional batt material fibers. Below the substrate is a base fabric 16 and a conventional batt material layer 18 is present below the base fabric 16 on the bottom surface of the press fabric 10.

Figure 2:
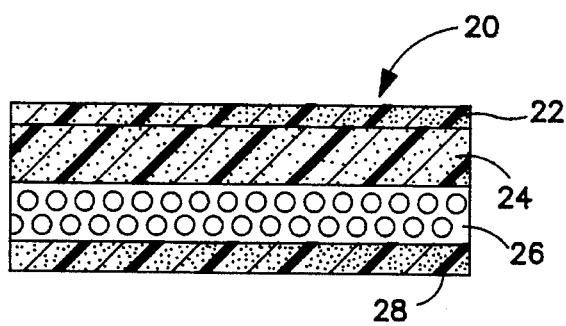
FIG. 2 is a diagrammatic view of another embodiment of the press fabric of the present invention.

FIG. 2 illustrates another embodiment of a press fabric 20 according to the present invention. In this embodiment, a base fabric 26 is surrounded on both sides by layers of batt material 22, 24 and 28. In this embodiment, all batt material layers 22, 24 and 28 incorporate bicomponent material, in amounts ranging from 10-100%.

Figure 3:
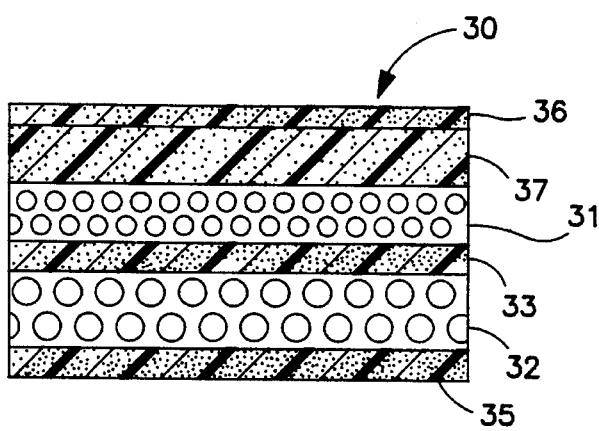
FIG. 3 is a diagrammatic view of still another embodiment of the press fabric of the present invention.

In a third embodiment shown in FIG. 3, a press fabric 30 is constructed with two base fabric layers 31, 32. A layer of batt material incorporating bicomponent material fibers 33 is positioned between the two base fabrics 31, 32. Additional layers of batt material incorporating bicomponent material fibers are placed on the side of the press fabric that contacts the papermaking surface, including two batt material layers, 36, 37 having batt material fibers of different thickness and a layer of batt material 35 also incorporating bicomponent material fibers is placed on the side of the press fabric 30 that will contact the machine.

Figure 4:
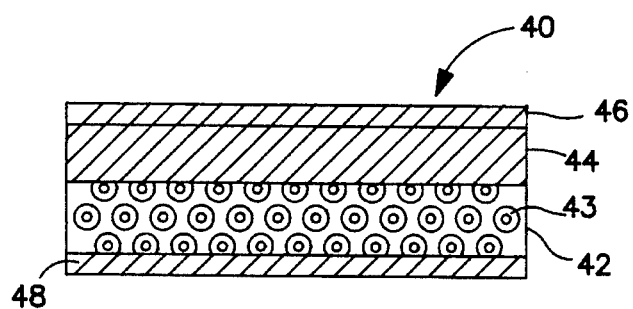
FIG. 4 is a diagrammatic view of another embodiment of the press fabric of the present invention.

A fourth embodiment of the press felt of the present invention 40 is shown in FIG. 4. In this embodiment, the base fabric 42 is produced from woven bicomponent material yarns 43. A press fabric produced from woven bicomponent material yarns may have one or more layers of batt material attached, although it need not have any batt material. In the embodiment shown in FIG. 4, base fabric 42 incorporating bicomponent material yarns 43 is surrounded by layers of batt material 44, 46, 48. As shown, the layers of batt material 44, 46, 48 are conventional batt material. However, any or all of the layers batt material 44, 46, 48 may incorporate 10-100% of bicomponent material fibers.

Figure 5:
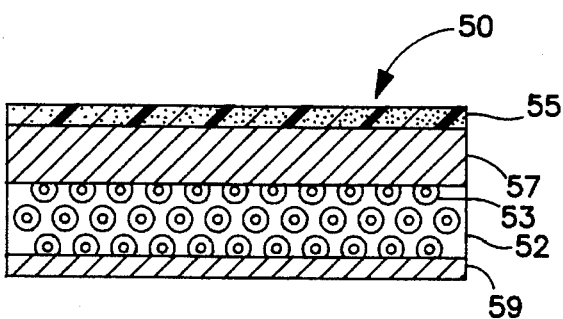
FIG. 5 is a diagrammatic view of yet another embodiment of the press fabric of the present invention.

FIG. 5 illustrates yet another embodiment of a press fabric 50 according to the present invention. In press fabric 50, base fabric 52 incorporates woven bicomponent material yarns 53. Of batt material layers 55, 57 and 59, cap layer 55 includes bicomponent material fibers. Batt layers 57 and 59 contain only conventional batt material. Of course, modifications to this embodiment will be obvious to those skilled in the art. For example, a press fabric as shown in FIG. 5 can include more than one base fabric. If so, at least one base fabric will include bicomponent material yarns in amounts ranging from 10-100%. In the described variation to FIG. 5, the layer of batt material between the base fabrics may include bicomponent material fibers, as may any or all of the layers of batt material throughout the press fabric.

It is within the knowledge of one skilled in this art to select the layers of the assembly to be included in a press fabric of the present invention. At least one base fabric with one or more layers of batt material are envisioned with this press felt, as are any number and types of fabric weaves. While a preferred embodiment of the invention has been described and illustrated, it will be understood that modifications may be made in the invention without departing from its spirit and purpose.

What is claimed is:

1. A press fabric for a papermaking machine comprising:
    a base fabric of interwoven machine direction yarns and cross machine direction yarns, 10-100% of said machine direction yarns and cross machine direction yarns being monofilaments of bicomponent material, having a sheath/core configuration said base fabric being heat set to produce a matrix within the base fabric.

2. The press fabric of claim 1 wherein the bicomponent material monofilaments comprise 20-60% of a higher melting point core material and 80-40% of a lower melting point covering material.

3. The press fabric of claim 1 wherein the monofilaments of bicomponent material are single monofilaments.

4. The press fabric of claim 1 wherein the monofilaments of bicomponent material are twisted monofilaments.

5. The press fabric of claim 1 further comprising at least one layer of batt material, said at least one layer of batt material joined to said base fabric to produce the press fabric.

6. The press fabric of claim 5 wherein the at least one layer of batt material includes stratified layers of batt material on a papermaking surface of the press fabric and wherein a cap layer of batt material comprises 10-100% bicomponent material fibers having a sheath/core configuration.

7. The press fabric of claim 5 wherein at least one layer of said at least one layer of batt material incorporates 10–100% bicomponent material fibers having a sheath/core configuration.

8. The press fabric of claim 7 wherein in at least one layer of said at least one layer of batt material, the bicomponent material fibers comprise 20–60% of a higher melting point core material and 80–40% of a lower melting point covering material.

9. The press fabric of claim 1 further comprising at least one additional base fabric of interwoven machine direction yarns and cross machine direction yarns.

10. The press fabric of claim 9 wherein at least one of the at least one additional base fabrics comprises interwoven machine direction yarns and cross machine direction yarns, 10–100% of said interwoven machine direction yarns and cross machine direction yarns being of bicomponent material having a sheath/core configuration.

11. The press fabric of claim 10 wherein in said at least one of the at least one additional base fabrics, the bicomponent material yarns comprise 20–60% of a higher melting point core material and 80–40% of a lower melting point covering material.

12. A press fabric for a papermaking machine comprising:
   at least one base fabric of interwoven machine direction yarns and cross machine direction yarns;
   at least one layer of batt material, at least one layer of said at least one layer of batt material comprising 10–100% bicomponent material fibers having a sheath/core configuration,
   said at least one base fabric and at least one layer of batt material joined together to form a structure; wherein said structure is heat set to produce a matrix within the batt layer.

13. The press fabric of claim 12 wherein in the at least one layer of said at least one layer of batt material, the bicomponent material fibers comprise 20–80% of a higher melting point core material and 80–60% of a lower melting point covering material.

14. The press fabric of claim 12 wherein the at least one base fabric comprises two base fabrics, and an assembly is formed by a layer of batt material incorporating 10–100% bicomponent material fibers having a sheath/core configuration positioned between said two base fabrics.

15. The press fabric of claim 14 further comprising:
   a cap layer of batt material incorporating 10–100% bicomponent material fibers having a sheath/core configuration positioned adjacent said at least one layer of batt material,
   a layer of batt material incorporating 10–100% bicomponent material fibers having a sheath/core configuration on a side of the assembly opposite to the side of the assembly adjacent the cap layer.

16. A process to produce a press fabric for use in a papermaking machine, comprising:
   providing a base fabric of interwoven machine direction yarns and cross machine direction yarns, 10–100% of said machine direction yarns and cross machine direction yarns being monofilaments of bicomponent material having a sheath/core configuration;
   providing at least one layer of batt material adjacent to the base fabric to form an assembly;
   needling the assembly;
   heat setting the needled assembly to produce a matrix within the needled assembly.

17. A process to produce a press fabric for use in a papermaking machine comprising:
   providing a base fabric of interwoven machine direction yarns and cross machine direction yarns,
   providing at least one layer of batt material adjacent the base fabric to form the assembly, at least one of the at least one layer of batt material including 10–100% bicomponent material fibers having a sheath/core configuration;
   needling the assembly;
   heat setting the needled assembly to produce a matrix within the needled assembly.

\* \* \* \* \*